US008646728B2

(12) United States Patent
Schuster

(10) Patent No.: US 8,646,728 B2
(45) Date of Patent: Feb. 11, 2014

(54) LOAD LIFTING APPARATUS FOR A HELICOPTER AND HELICOPTER

(76) Inventor: Matthias Schuster, Benningen (DE)

( * ) Notice: Subject to any disclaimer, the term of this patent is extended or adjusted under 35 U.S.C. 154(b) by 39 days.

(21) Appl. No.: 13/325,606

(22) Filed: Dec. 14, 2011

(65) Prior Publication Data

US 2012/0145832 A1 Jun. 14, 2012

Related U.S. Application Data

(63) Continuation of application No. PCT/EP2010/058864, filed on Jun. 23, 2010.

(30) Foreign Application Priority Data

Jun. 23, 2009 (DE) .......................... 10 2009 030 934

(51) Int. Cl.
    *B64D 1/12* (2006.01)
(52) U.S. Cl.
    USPC ..................................... 244/137.4; 244/1 TD
(58) Field of Classification Search
    USPC ................................. 244/137.1, 137.4, 1 TD
    See application file for complete search history.

(56) References Cited

U.S. PATENT DOCUMENTS

| | | | |
|---|---|---|---|
| 3,220,590 A | 11/1965 | Walker | |
| 3,554,468 A | 1/1971 | McVicar | |
| 3,804,371 A | 4/1974 | Mills et al. | |
| 4,152,019 A | 5/1979 | Jarman et al. | |
| 6,199,793 B1 * | 3/2001 | Hainsworth et al. | 244/1 TD |
| 6,418,989 B1 | 7/2002 | Jarman | |
| 2002/0171008 A1 * | 11/2002 | Schuster | 244/118.1 |

FOREIGN PATENT DOCUMENTS

| | | |
|---|---|---|
| CH | 104859 | 7/1923 |
| DE | 1 106 605 | 5/1961 |
| DE | 1 253 058 | 10/1967 |
| DE | 1 456 092 | 1/1969 |
| DE | 2 021 040 | 11/1971 |
| DE | 2 210 084 | 10/1972 |
| DE | 33 23 513 A1 | 1/1985 |
| DE | 44 18 354 A1 | 11/1995 |
| DE | 199 50 405 A1 | 5/2001 |

OTHER PUBLICATIONS

ISA/EP;English language translation of International Preliminary Report on Patentability (Chapter 1); Issued by WIPO Jan. 17, 2012; 7 pages.

* cited by examiner

*Primary Examiner* — J. Woodrow Eldred
(74) *Attorney, Agent, or Firm* — Harness, Dickey & Pierce, P.L.C.

(57) ABSTRACT

A load lifting apparatus for a helicopter has a cable, including a supply length in a cable store. The cable is secured at one end to the helicopter and has a free end. A load-bearing element, on which a load to be raised can be secured, is arranged on the cable. The cable can be removed from the cable store in order to lower the load-bearing element downwards from the helicopter. As the load-bearing element is lowered or pulled upwards, the cable acts at a force-introduction location on the helicopter. The load-bearing element is arranged on the cable such that it can move along the cable. At least one cable-attachment location is present on the helicopter, and is spaced apart from the force-introduction location and has, or can have, the free end of the cable secured on it.

21 Claims, 5 Drawing Sheets

LOAD LIFTING APPARATUS FOR A HELICOPTER AND HELICOPTER

CROSS-REFERENCES TO RELATED APPLICATIONS

This application is a continuation of international patent application PCT/EP2010/058864, filed on Jun. 23, 2010, and designating the U.S., which international patent application has been published in German language and claims priority from German patent application 10 2009 030 934.9, filed on Jun. 23, 2009. The entire contents of these applications are incorporated herein by reference.

BACKGROUND OF THE INVENTION

The invention relates to a load lifting apparatus for a helicopter. The invention further relates to a helicopter comprising a load lifting apparatus. In particular, the invention relates to a type of load lifting apparatus comprising a cable, of which a supply length is present in a cable store, wherein the cable, on the one hand, is secured on the helicopter and, on the other hand, has a free end, and a load-bearing element, which is arranged on the cable and on which a load which is to be raised can be secured, wherein the cable can be removed from the cable store in order to lower the load-bearing element downwards from the helicopter, wherein the cable, as the load-bearing element is being lowered or pulled upwards, acts at a force-introduction location on the helicopter.

A load lifting apparatus of the type mentioned before is used, in particular, in rescue helicopters for rescuing accident victims. Such rescue helicopters are often used for sea and mountain rescue.

A load lifting apparatus which is known from DE 33 23 513 A1 has a cable store in the form of a winch, on which a supply length of cable is stored. The winch in this document is mounted on the ceiling in the cabin of the helicopter. From the winch, the cable is guided outwards out of the cabin of the helicopter along an extension arm, wherein the end of the extension arm has arranged on it a deflecting roller, via which the cable then leads away downwards under the force of gravity. In this case, the deflecting roller arranged at the end of the extension arm constitutes the force-introduction location at which the cable acts on the helicopter as the load is being lowered or pulled upwards.

The load-bearing element of the known load lifting apparatus is de-signed as a load hook which is fastened at the free end of the cable. The rescue harness can then be suspended from the load hook in the event of rescuing an accident victim.

Rescuing people using a helicopter which is equipped with a load lifting apparatus like the known load lifting apparatus gives rise to the following problems. Since the rescue takes place from the air, and the cable is correspondingly lowered to the rescue site in order to pick up the person who is to be rescued, the load suspended from the load-bearing element is subjected to the downwardly directed downwash from the helicopter rotor. The downwash, in addition to a downwardly directed component, also has a pronounced rotary component in the direction of rotation of the rotor. This rotary component is sufficient in order for the load suspended from the cable to be set in rotation about the cable axis. In the event of a person who is to be rescued being suspended from the cable, the person is correspondingly set in rotation about the cable axis, wherein rotational speeds of approximately two to three revolutions per second are reached. The centrifugal forces acting on the person here are so pronounced that, while they may perhaps yet be withstood by a healthy individual, they will not be withstood by somebody who is weak, for example somebody who has been injured, and is to be rescued from an accident site. This problem arises both for picking up the load and for setting down a load on the ground, and in particular when the helicopter, rather than flying forwards, is hovering in the air during these procedures, whereas the rotary downwash is less obvious when the helicopter is flying forwards. The attempt is therefore often made to start forward flying immediately after the load has been picked up or, conversely, to set down the load while flying forwards. However, this procedure is not readily possible on difficult terrain, in particular in mountainous terrain, for example if a person has to be rescued from a deep crevice.

Another possible way of avoiding rotation of the load suspended from the cable consists in an auxiliary on the ground holding an anti-rotation line, which is fastened on the load harness, under tensioning at an angle of 45° to 90° to the cable of the load lifting apparatus, rotation of the load likewise being avoided as a result. However, this procedure is also problematic in difficult terrain, and terrain which is difficult to access, in particular for rescuing people at sea, where it is difficult, if not impossible, to set down the auxiliary. There is also the disadvantage that more personnel and equipment is required for a rescue attempt.

There is therefore a need for a load lifting apparatus for a helicopter which avoids the aforementioned problems.

Load lifting apparatus which use multi-cable systems are also known. Thus, for example, DE 2 021 040 A1 describes a load lifting apparatus in which a cable is attached at each corner of the load and the cables are wound up by individual winches on board the helicopter. Such a load lifting apparatus, in addition to being of complex design, is also disadvantageous in the event where an emergency situation requires the load to be jettisoned, for which reason all four cables then have to be cut individually. In order to avoid this problem, the document proposes fastening, on the load cable fastened on the helicopter, a load beam, from which, in turn, a plurality of cables extend downwards.

Further such complex-design load lifting apparatus for helicopters are described in DE 1 253 058 A1, DE 1 106 605 A1, DE 1 456 092 and DE 2 210 084.

SUMMARY OF THE INVENTION

It is therefore an object of the invention to develop a load lifting apparatus of the type mentioned in the introduction such that the tendency to rotate of the load suspended from the cable is at least reduced, wherein the load lifting apparatus here should be of straightforward design.

It is a further object of the invention to provide a helicopter having such a load lifting apparatus.

According to an aspect, a load lifting apparatus for a helicopter is provided, comprising a cable having a length and a free end, a cable store for storing at least a part of the length of the cable, wherein the cable can be removed from the cable store, a load-bearing element arranged on the cable for suspending a load from the load bearing element, the load-bearing element being moved downwards from the helicopter upon removal of the cable from the cable store, the load-bearing element being arranged on the cable such that it can move along the cable, a force-introduction location arranged on the helicopter, on which the cable acts on the helicopter, as the load-bearing element is being lowered or raised, at least one cable-attachment location arranged on the helicopter for securing the free end of the cable on the helicopter, the at least one cable-attachment location being spaced apart from the force-introduction location so that the cable extends between the force-introduction location and the cable-attachment location.

According to another aspect, a helicopter is provided, comprising a load lifting apparatus, the load lifting apparatus having a cable having a length and a free end, a cable store for storing at least a part of the length of the cable, wherein the cable can be removed from the cable store, a load-bearing element arranged on the cable for suspending a load from the load bearing element, the load-bearing element being moved downwards from the helicopter upon removal of the cable from the cable store, the load-bearing element being arranged on the cable such that it can move along the cable; the helicopter further comprising a force-introduction location, on which the cable acts on the helicopter, as the load-bearing element is being lowered or raised, at least one cable-attachment location for securing the free end of the cable on the helicopter, the at least one cable-attachment location being spaced apart from the force-introduction location so that the cable extends between the force-introduction location and the cable-attachment location in a V-shape.

Whereas the known load lifting apparatus are based on single-point attachment of the cable of the load lifting apparatus, to be precise merely at the location where force is introduced from the cable into the helicopter, the load lifting apparatus according to the invention is based on multi-point attachment of the cable on the helicopter. For this purpose, the load-bearing element, rather than being fixed at the free end of the cable, is now secured on the cable such that it can move along the cable. From the force-introduction location, the cable thus runs to the load-bearing element and, from there, on to the at least one cable-attachment location, which is spaced apart from the force-introduction location. The cable of the load lifting apparatus according to the invention thus forms, from the force-introduction location to the cable-attachment location, essentially a V-shape, wherein the load-bearing element is located, under the force of gravity, at the lowermost location of the V. Rotation of the cable about the cable axis of the cable portion from the force-introduction location to the load-bearing element is avoided, as a result of the cable portion running from the load-bearing element to the cable-attachment location, if the spacing between the cable-attachment location and the force-introduction location is selected to be sufficiently large; i.e. the greater the angle between the cable portion running from the force-introduction location to the load-bearing element and the cable portion running from the load-bearing element to the cable-attachment location, the less is the tendency of the load-bearing element to rotate on account of rotary downwash from the rotor in operation. A further advantage of the invention consists, as a result of the positional stability of the cable, in that it is possible to rotate the suspended load by rotation of the helicopter about the vertical axis, in order to be brought into a defined position, which is advantageous, for example, for mountain rescue.

A further advantage of the load lifting apparatus according to the invention consists in that deflecting the cable on the load-bearing element halves the force which is necessary for raising a load. This is because the load-bearing element, on account of its capacity to move relative to the cable, acts as a loose roller of a block and tackle. Conversely, this means that double the load can be raised.

Yet another advantage of the load lifting apparatus according to the invention, in particular in relation to the load lifting apparatus which is known from DE 33 23 513 A1 mentioned in the introduction, consists in that, as a result of the two-point attachment of the cable on the helicopter and of the load-bearing element which can move along the cable, this load-bearing element, in the lowered state, moves automatically more or less to beneath the center of gravity of the helicopter, even if the force-introduction location is at a large distance from the longitudinal center axis of the helicopter, as a result of which tilting moments to which the helicopter is subjected by the load which is to be raised are reduced. It is thus possible for the helicopter to be controlled more easily by the pilot using the load lifting apparatus according to the invention, with load suspended, than using the known load lifting apparatus, in the case of which the tilting moments caused by the load are considerably greater and the pilot has to use appropriate opposite controls. This also means that the load lifting apparatus according to the invention avoids, or reduces, hazardous flying situations.

The load lifting apparatus according to the invention is of very straight-forward design because, like the known load lifting apparatus, it manages with just one cable and just one cable store, albeit without having the disadvantages of the known load lifting apparatus.

It is also possible to provide a plurality of cable-attachment locations, which are distributed over the helicopter, and therefore it is possible to select the cable-attachment location which is most expedient for the case in hand.

It is also possible for an auxiliary cable to be attached to the at least one cable-attachment location, wherein the free end of the carrying cable is then fastened at the free end of the auxiliary cable.

In a preferred configuration, the at least one cable-attachment location is spaced apart from the force-introduction location in a direction transverse to the longitudinal axis of the helicopter, wherein preferably the force-introduction location is arranged on one side of the longitudinal center axis of the helicopter, at a distance from this longitudinal center axis, and the cable-attachment location is arranged on the other side of the longitudinal center axis, at a distance therefrom.

This measure is advantageous, in particular, when, as with the load lifting apparatus known from DE 33 23 513 A1, the force-introduction location is arranged at a lateral distance from the cabin of the helicopter, because, as a result of the aforementioned measure of securing the free end of the cable on the at least one cable-attachment location on the other side of the longitudinal axis of the helicopter, the load-bearing element, with the cable lowered, ends up located in the vicinity of, or even on, the longitudinal center plane of the helicopter, as a result of which tilting moments about the longitudinal axis of the helicopter are reduced or avoided altogether.

In a further preferred configuration, the at least one cable-attachment location is spaced apart from the force-introduction location in the direction of the longitudinal axis of the helicopter.

This measure has the advantage that tilting moments about the transverse axis of the helicopter, i.e. tilting moments which result in the helicopter tilting about the transverse axis, can be reduced. If the force-introduction location is located, for example, behind the center of gravity, as seen in the longitudinal direction of the helicopter, the cable-attachment location is provided preferably in front of the center of gravity of the helicopter, and vice versa.

In conjunction with the aforementioned configuration, the at least one cable-attachment location and the force-introduction location are preferably arranged laterally on the same side of the helicopter.

As a result, although tilting moments about the longitudinal axis of the helicopter, with a load suspended, are not reduced, this measure has the advantage that the entire load lifting apparatus is arranged in a user-friendly manner on the same side of the helicopter.

As an alternative to this, the cable-attachment location and the force-introduction location may be arranged along the longitudinal center axis of the helicopter.

This measure has the advantage that a load suspended from the cable does not generate any tilting moment about the longitudinal axis of the helicopter; in addition, spacing apart the cable-attachment location and the force-introduction location in the direction of the longitudinal axis makes it possible to reduce tilting moments about the transverse axis of the helicopter.

Of course, the aforementioned configurations may also be combined with one another. For example, the at least one cable-attachment location may be spaced apart from the force-introduction location both in a direction transverse to the longitudinal axis of the helicopter and in the direction of the longitudinal axis of the helicopter, as a result of which a combination of these configurations allows the load-bearing element (in the lowered state) to find an expedient position in relation to the center of gravity of the helicopter.

If the helicopter has a skid undercarriage, the at least one cable-attachment location is preferably arranged on the skid undercarriage.

Arranging the at least one cable-attachment location on the skid undercarriage has the advantage that the cable-attachment location is easily accessible for an operator, which is advantageous, in particular, when the free end of the cable, rather than remaining attached permanently at the cable-attachment location, is attached at the cable-attachment location just prior to being used for load-raising purposes.

In a further preferred configuration, the load-bearing element has at least one deflecting roller, via which the load-bearing element is guided such that it can move along the cable.

This measure has the advantage that the load-bearing element is guided such that it can move along the cable essentially without friction, as a result of which the load-bearing element, in particular as it is being lowered, can always move to the lowermost point. This configuration advantageously increases the operational reliability of the load lifting apparatus. A further advantage consists in that, in the case of the load swinging in the plane of the two cable portions, on either side of the deflecting location, the swinging movement can be damped.

As an alternative, however, it is also possible for the load-bearing element to have a sliding-action deflecting element, on which the cable is guided with a sliding action.

The aforementioned configuration has the advantage of lower costs for producing the load lifting apparatus.

In conjunction with the two previously mentioned configurations, it is preferred if the load-bearing element has a cup, in which the deflecting roller or the sliding-action deflecting element is arranged.

In this configuration, the cable is guided into the cup, positioned around the deflecting roller or the sliding-action deflecting element there, and exits from the cup again at some other location. In order that the cable does not shoot out of the cup in an undesirable manner when the free end of the cable is not attached at the cable-attachment location, a stopper can be arranged at the free end of the cable, which avoids the situation where the cable shoots out.

In a further preferred configuration, the free end of the cable can be secured at the at least one cable-attachment location by means of a rapid-release closure.

Such a rapid-release closure may be, for example, a shackle or a carabiner, which can easily be used for attaching the free end of the cable at the cable-attachment location.

In a further preferred configuration, the cable store has a winch, in particular a motor winch.

Within the scope of the invention, it is possible for the load lifting apparatus also to be operated without a winch, for example by the cable store simply being realized in that the cable is kept in a coiled-up state in the cabin of the helicopter, or on the cabin of the helicopter, and is lowered gradually when used for rescuing a person, the cable then acting at the force-introduction location of the helicopter. However, using a winch, in particular a motor winch, has the advantage of easier operability, in particular for raising heavy loads. The winch can be mounted in a fixed or displaceable position on the helicopter, as is already known per se. It is possible for the winch to be used, obviously, in "single-cable operation", as is customary, but also in "two-cable operation" according to the invention.

According to another aspect, a helicopter is provided, comprising a load lifting apparatus, the load lifting apparatus having a cable having a length and a free end, a cable store for storing at least a part of the length of the cable, wherein the cable can be removed from the cable store, a load-bearing element arranged on the cable for suspending a load from the load bearing element, the load-bearing element being moved downwards from the helicopter upon removal of the cable from the cable store, the load-bearing element being arranged on the cable such that it can move along the cable; a force-introduction location, on which the cable acts on the helicopter, as the load-bearing element is being lowered or raised, a plurality of cable-attachment locations for selectively securing the free end of the cable on the helicopter, the at least one cable-attachment location being spaced apart from the force-introduction location so that the cable extends between the force-introduction location and the cable-attachment location, wherein a first cable-attachment location of the plurality of cable-attachment locations is spaced apart from the force-introduction location in a direction transverse to a longitudinal center axis of the helicopter, wherein a second cable-attachment location of the plurality of cable-attachment locations is spaced apart from the force-introduction location in a direction of the longitudinal center axis of the helicopter.

Further advantages and features can be gathered from the following description and from the accompanying drawing.

Of course, the features which have been mentioned above, and those which have yet to be explained hereinbelow, can be used not just in the given combination, but also in other combinations or on their own, without departing from the frame-work of the present invention.

BRIEF DESCRIPTION OF THE DRAWINGS

Exemplary embodiments of the invention are illustrated in the drawing and will be described in more detail hereinbelow with reference to this drawing, in which.

DESCRIPTION OF PREFERRED EMBODIMENTS

Figure 1:
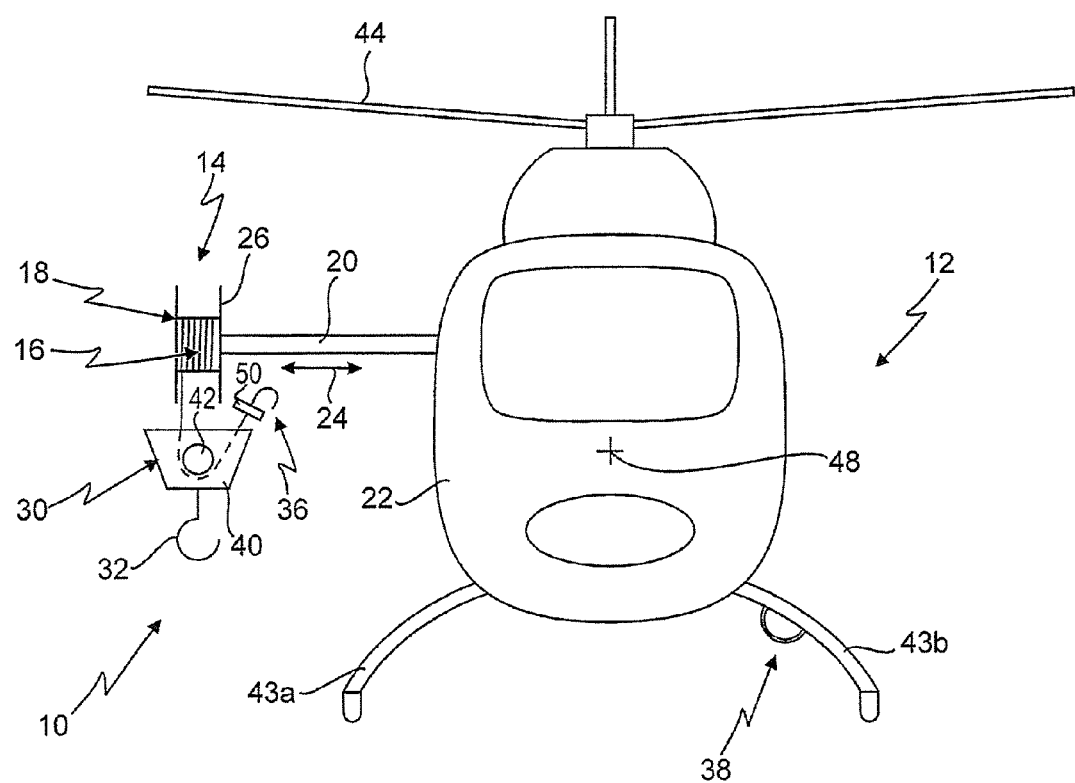
FIG. 1 shows, schematically, a load lifting apparatus according to the invention which is intended for a helicopter and is in a first operating state, the helicopter being shown in front view.
Figure 2:
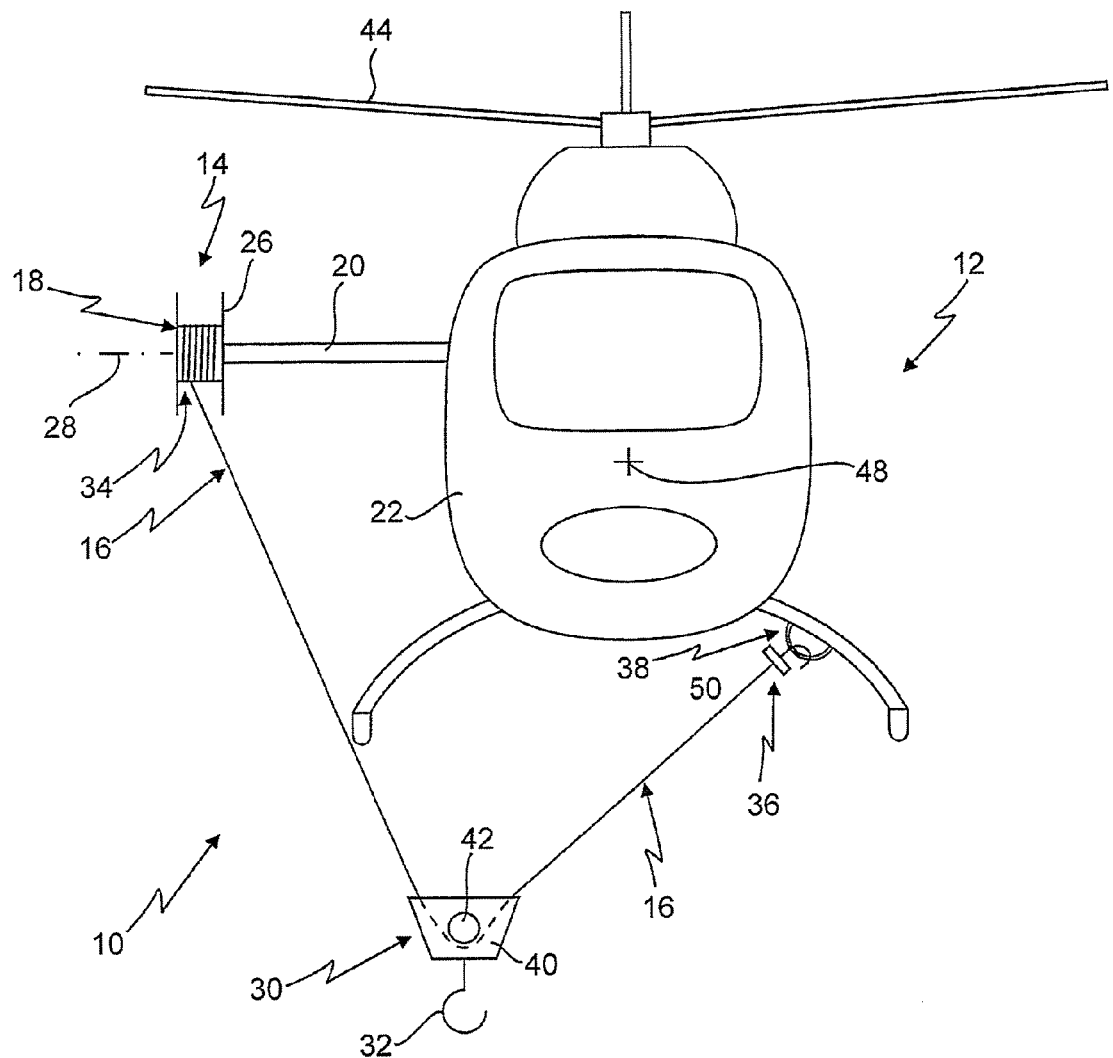
FIG. 2 shows the load lifting apparatus in a second operating state.
Figure 3:
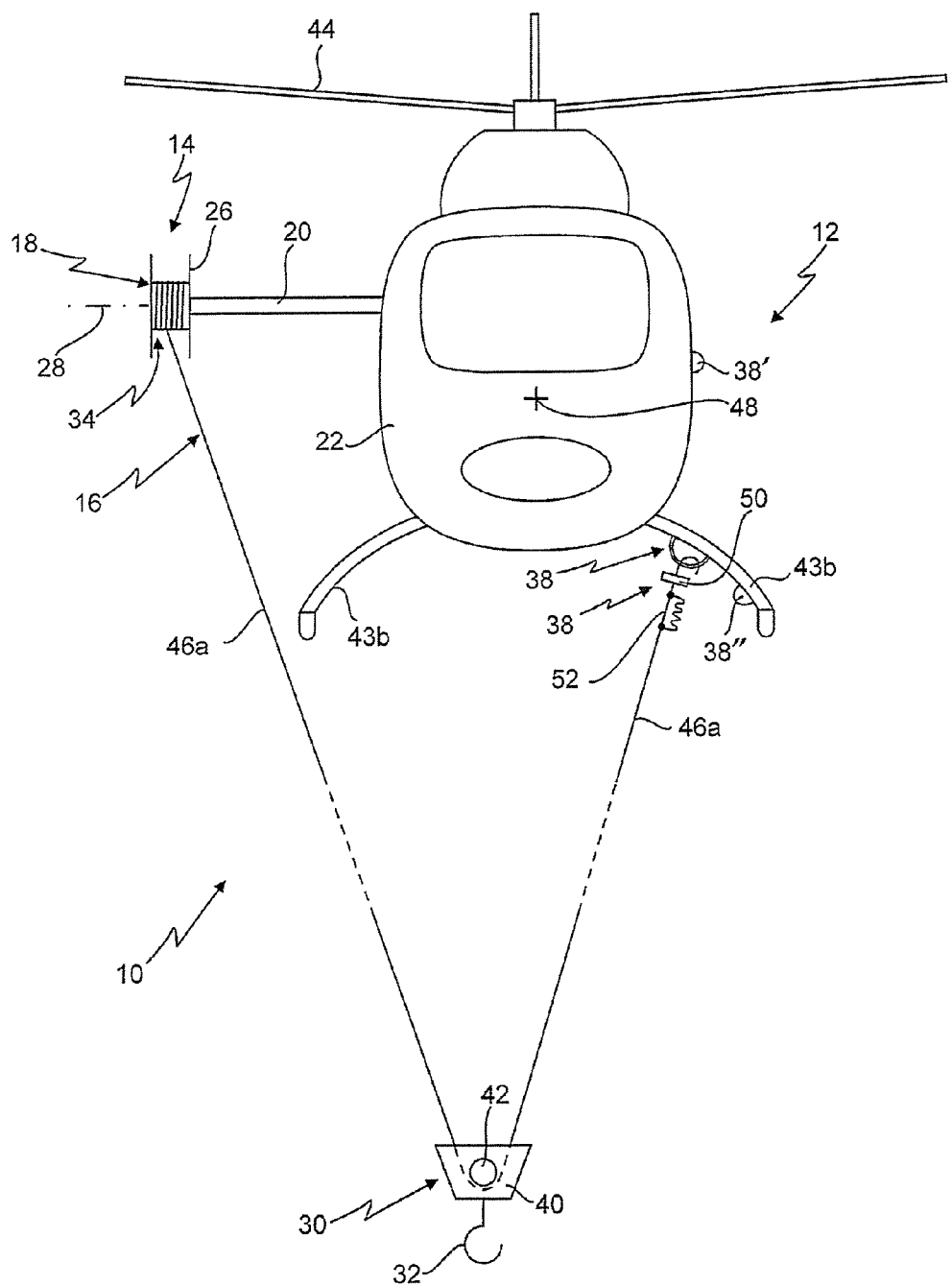
FIG. 3 shows the load lifting apparatus in a third operating state.

FIGS. 1 to 3 illustrate three different operating states of a load lifting apparatus which is provided with the general reference numeral 10 and is intended for a helicopter 12.

The load lifting apparatus 10 is used, for example, in the helicopter 12 to rescue people, mountain or sea rescue being examples of areas where this is deployed.

The load lifting apparatus 10 has a cable store 14, in which a supply length of a cable 16 is stored.

In the exemplary embodiment shown, the cable store 14 is designed as a winch, in particular a motor winch 18. The winch 18 may be of a design used conventionally in load lifting apparatus for helicopters. In the exemplary embodiment shown, the winch 18 is mounted on an extension arm 20, wherein the extension arm 20 is secured on the cabin 22 of the helicopter 12. The extension arm 20 may be designed to be displaceable, in particular according to a double arrow 24, and therefore the motor winch 18, when not being used for raising loads, can be displaced onto or into the cabin 22, and, in order to be used for raising loads, can be moved into the position which is illustrated in FIGS. 1 to 3.

The motor winch 18 may have a cable drum 26, on which the cable 16 is stored.

By virtue of the cable drum 26 being rotated about an axis of rotation 28 (FIGS. 2 and 3), the cable 16 can be unwound from the cable drum 26 and wound up onto the same.

The cable 16 has one end secured on the helicopter 12, wherein the cable 16, in the exemplary embodiment shown, is secured on the helicopter via the motor winch 18.

A load-bearing element 30 is arranged on the cable 16.

A load which is to be raised (not illustrated) can be secured on the load-bearing element 30. For this purpose, the load-bearing element 30 has, by way of example, a load hook 32.

The cable 16 can be removed from the cable store 14, i.e. more precisely from the motor winch 18, in order to lower the load-bearing element 30 downwards from the helicopter 12.

FIG. 1 illustrates that state of the load lifting apparatus 10 in which essentially the entire cable 16 is stored in the cable store 14, and therefore the load-bearing element 30 is located in the vicinity of the helicopter 12. FIG. 3 shows that state of the load lifting apparatus 10 in which the load-bearing element 30 has been lowered downwards by virtue of cable 16 being removed from the cable store 14, i.e. by virtue of the cable 16 being unwound from the cable drum 26, wherein the cable 16 is illustrated partly by broken lines in FIG. 3 in order to portray that the load-bearing element 30 is located far beneath the helicopter 12, for example at a distance of 10 to 50 m beneath the helicopter 12. FIG. 2 shows an intermediate state between the states of the load lifting apparatus 10 in FIGS. 1 and 3.

On the helicopter, the cable 16, as the load-bearing element 30 is being lowered or pulled upwards, has one end acting at a force-introduction location 34. In the exemplary embodiment shown, the force-introduction location 34 is defined by the location at which the cable 16 is being unwound from the cable drum 26 at any moment in time. In the case of this configuration, the force-introduction location 34 is thus located in the immediate vicinity of the cable store 14. It is of course the case, however, that the force-introduction location 34 and the cable store 14 may also be spaced apart from one another. It is thus also possible to use, for the purposes of the present invention, for example the winch arrangement according to DE 33 23 513 A1, which is mentioned in the introduction and in the case of which the winch is arranged in the cabin 22 of the helicopter and the cable 16 is guided out of the cabin 22 of the helicopter 12 from the winch via an extension arm, for example the extension arm 20, and hangs downwards from there, for example, via a deflecting roller. In this case, the roller which is present on the extension arm 20 then constitutes the force-introduction location of the cable 16.

The cable 16 has a free end 36. The load lifting apparatus 10 has at least one cable-attachment location 38, which is spaced apart from the force-introduction location 34 and has, or can have, the free end 36 of the cable 16 secured on it. In the operating state of the load lifting apparatus 10, the cable 16 is thus connected to the helicopter 12 via a two-point attachment, to be precise, on the one hand, at the respective force-introduction location 34 and, on the other hand, at the cable-attachment location 38.

In order that, in the case of this method of attaching the cable 16 to the helicopter 12, the load-bearing element 30 always moves downwards as cable 16 is being removed from the cable store 14, the load-bearing element 30 is arranged on the cable 16 such that it can move along the cable 16.

In the exemplary embodiment shown, the load-bearing element 30 has a cup 40, in which is arranged a deflecting roller 42, about which the cable 16 is guided, as a result of which the load-bearing element 30 can move along the cable 16. As the load-bearing element 30 is being lowered, it is thus always located at the lowermost point between the cable-attachment location 38 and the force-introduction location 34. As the load-bearing element 30 is being lowered by virtue of cable 16 being removed from the cable store 14, and as the load-bearing element 30 is being raised by virtue of the cable 16 being guided back into the cable store 14, relative movement thus takes place in each case between the load-bearing element 30 and the cable 16.

The functioning of the load lifting apparatus 10 will now be described hereinbelow.

FIG. 1 illustrates the state in which essentially the entire cable 16 is stored in the cable store 14. Correspondingly, the load-bearing element 30 is located in the vicinity of the force-introduction location 34.

By virtue of the cable 16 being removed from the cable store 14, in the present case by virtue of the cable 16 being unwound from the motor winch 18, the load-bearing element 30 moves downwards first of all in the direction of gravity. A crew member of the helicopter 12 can then grip the free end 36 of the cable 16. If the helicopter 12, as shown, has a skid undercarriage 43a, 43b, the crew member guides the free end 36 through beneath the skid undercarriage 42 and secures the free end 36 at the cable-attachment location 38. For this purpose, the free end 36 of the cable 16 may have a rapid-release closure, for example a carabiner or a shackle, and the cable-attachment location 38 may be designed, for example, as an eyelet. Once the free end 36 of the cable 16 has been secured, the load lifting apparatus 10 is in a state as is illustrated in FIG. 2. By virtue of the cable 16 being removed further from the cable store 14, the load-bearing element 30 then moves further downwards, on account of the relative movement between the load-bearing element 30 and the cable 16, until the load-bearing element 30 is located on the ground at the site where, for example, an accident victim is to be rescued. The steps described above take place with the rotor 44 of the helicopter 12 in operation, wherein there is no need here for the helicopter 12 to be flying forwards; rather, the helicopter 12 can hover in the air as the steps are being carried out.

As is evident, in particular, from FIG. 3, the cable 16 forms a V-shaped arrangement overall, wherein a first cable portion 46a extends from the force-introduction location 34 to the load-bearing element 30, more specifically to the deflecting roller 42, and, from there, a second cable portion 46b extends to the cable-attachment location 38. The resulting V-shaped arrangement of the cable portions 46a and 46b avoids the situation where the downwardly directed rotary downwash which occurs during operation of the rotor 44 sets the cable 16 in rotation, and therefore it is also the case that the load suspended on the load-bearing element 30 is not set in rotation.

In the case of the exemplary embodiment according to FIGS. 1 to 3, the position of the cable-attachment location 38 is selected such that it is spaced apart from the force-introduction location 34, as seen in relation to a longitudinal axis 48 of the helicopter 12, in a direction transverse to the longitudinal axis 48, wherein the force-introduction location 34, as seen in the drawing and with the helicopter 12 flying forwards, is located to the right of the longitudinal axis 48, at a distance therefrom, and the cable-attachment location 38 is correspondingly located to the left of the longitudinal axis 48, and at a distance therefrom. As a comparison of FIGS. 2 and 3 shows, this arrangement means that the load-bearing element 30, as it is being lowered downwards, moves beneath the helicopter 12 to an increasing extent, i.e. moving increasingly closer to the longitudinal center plane of the helicopter 12, as a result of which tilting moments which, with a load suspended from the load-bearing element 30, can cause the helicopter 12 to tilt about the longitudinal axis 48 are reduced, even if the force-introduction location 34 is at a large distance from the longitudinal center plane of the helicopter 12 or from the center of gravity of the helicopter 12, as is illustrated in FIGS. 1 to 3.

In the exemplary embodiment shown, in the case of which the helicopter 12 has a skid undercarriage 43a, 43b, the cable-attachment location 38 is located, for example, on the skid undercarriage 43b. However, it is also possible for the cable-attachment location 38 to be located laterally on the cabin 22, as is indicated in FIG. 3 by reference numeral 38'. Selecting the position of the cable-attachment location 38 on the skid undercarriage 43b, however, has the advantage of spacing apart the cable-attachment location 38 to a greater extent from the longitudinal center plane of the helicopter 12. It is thus also possible for the cable-attachment location 38 to be arranged at the outer end of the skid undercarriage 43b, as is indicated in FIG. 3 by 38".

Whereas, in the case of the exemplary embodiment according to FIGS. 1 to 3, the cable-attachment location 38 is spaced apart from the force-introduction location 34 in a direction transverse to the longitudinal axis 48, to be precise the distance is selected to be as large as possible in respect of the structural conditions of the helicopter 12, it is also possible, in addition, for the cable-attachment location 38 to be spaced apart from the force-introduction location 34 in the direction of the longitudinal axis 48. It is thus possible, for example, for the force-introduction location 34 to be arranged at the rear end of the cabin 22, as seen in the direction in which the helicopter 12 is flying forwards, and for the cable-attachment location 38 to be arranged level with the front end of the skid undercarriage 43b. This additionally reduces tilting moments about a transverse axis which runs perpendicularly to the longitudinal axis 48, i.e. the load-bearing element 30 then also moves further beneath the center of gravity of the helicopter 12 as seen in relation to the longitudinal axis 48.

Instead of the situation illustrated in the drawing, it is also possible for an auxiliary cable to be attached at the cable-attachment location 38, the free end 36 of the cable 16 being fastened on this auxiliary cable. When the load lifting apparatus 10 is not in use, that end of the auxiliary cable at which the free end 36 is then fastened may be provided, for easy accessibility, outside the cabin 22, preferably on the same side as that on which the cable store 14 is arranged. It is possible here for the auxiliary cable, if the helicopter has a skid undercarriage, to be guided past beneath the skid on the cable-store side of the helicopter.

In order to avoid the situation where the load-bearing element 30, in the operating state which is shown in FIG. 1, comes loose from the cable 16 and falls downwards, for example a stopper 50 is secured on the cable 16 at the free end 36 of the cable 16, this stopper preventing the cable 16 from shooting out of the load-bearing element 30.

If the stopper 50 is positioned on the cable 16 at a greater distance from the cable-attachment location than that which is illustrated in FIG. 2 or 3, it also has the effect, as the load is being raised, that the load-bearing element 30, from the moment at which the stopper 50 strikes against the load-bearing element 30, as the cable 16 is being hauled in further, is pulled away laterally to a more pronounced extent from the longitudinal center plane of the helicopter in the direction of the cable store 14, as a result of which the load is easier to bring upwards past the skid undercarriage 43a and into the cabin 22.

It is also possible, as is illustrated only in FIG. 3, for a cable-cutting means 52, for example a pyrotechnical cable-cutting means, to be present on the cable 16, in order for it to be possible for the load-bearing element 30 to be jettisoned in the event of an emergency, in order to avoid a hazardous flying situation. The cable-cutting means 52 severs the cable 16 in front of the point at which the cable 16 is secured at the cable-attachment location 38, and still on that side of the stopper 50 which is directed towards the load-bearing element 30, and therefore, when the cable 16 is cut at the cable-cutting means 52, the cable 16 can shoot out of the load-bearing element 30, and the load-bearing element 30 can thus drop off.

Arranging the load-bearing element 30 in a movable manner relative to the cable 16, furthermore, gives rise to the forces to which the cable portion 46a is subjected being halved, and therefore, for the purpose of raising a load by means of the load-bearing element 30, although the pulling distance of the cable 16 is doubled, the amount of force necessary for this purpose is nevertheless halved.

The cable 16 is, in particular, a wire cable and has an overall length of approximately 90 m, and therefore the load-bearing element 30 can be lowered downwards by approximately 45 m overall.

Figure 4:
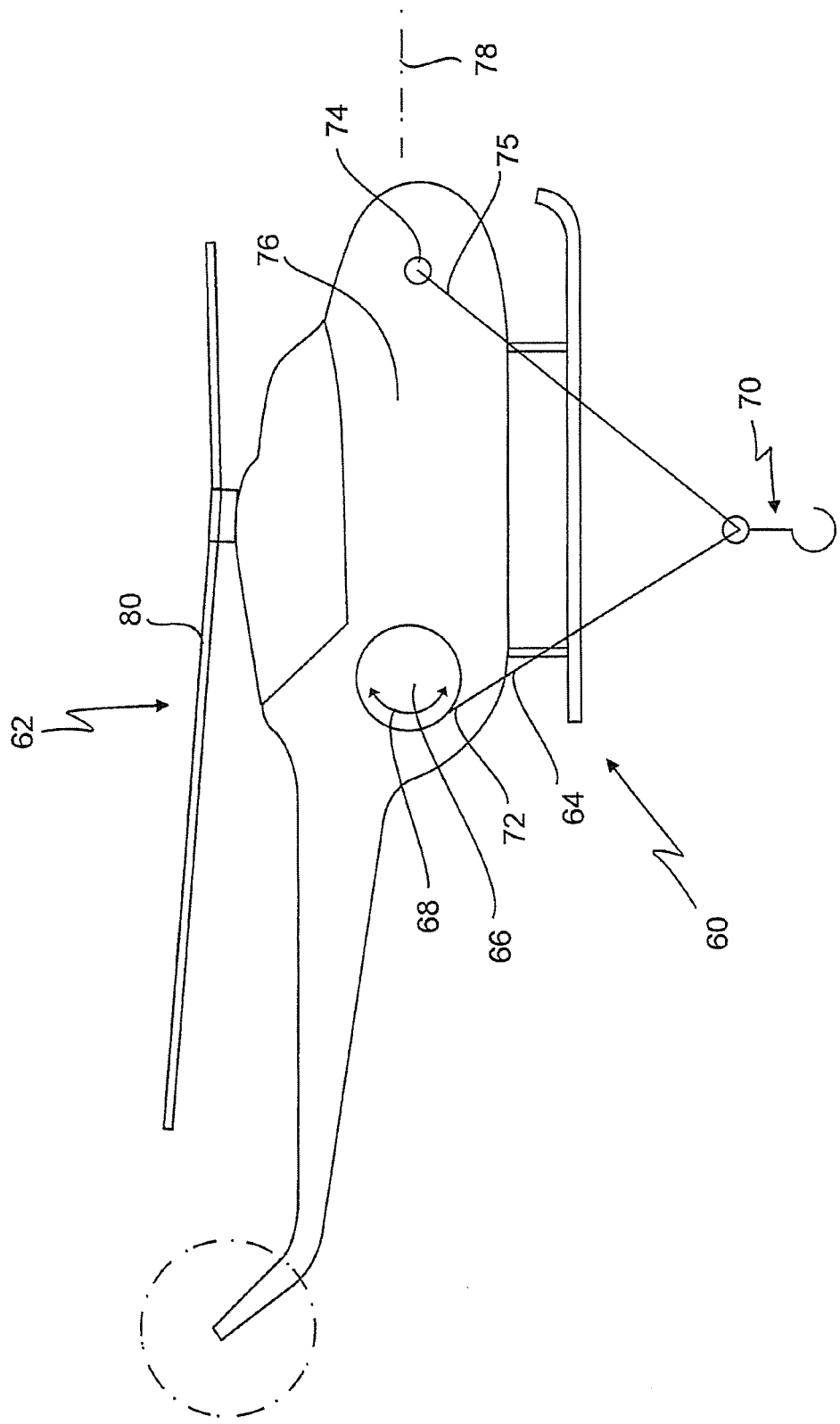
FIG. 4 shows a further exemplary embodiment of a load lifting apparatus for a helicopter, the helicopter being shown in side view.

FIG. 4 illustrates a further exemplary embodiment of a load lifting apparatus 60 for a helicopter 62. The load lifting apparatus 60 has a cable 64, a cable store 66, for example a winch, as is indicated by a double arrow 68, and a load-bearing element 70. The load-bearing element 70 can move relative to the cable 64 along the cable 64, wherein for example the configuration according to the exemplary embodiment in FIGS. 1 to 3 may be selected for the load-bearing element 70.

Differently from the previous exemplary embodiment, a force-introduction location 72 for the cable 64 and a cable-attachment location 74 for a free end 75 of the cable 64 are located on the same side, on the outside of a cabin 76 of the helicopter 62, and are thus spaced apart from one another merely in the direction of the longitudinal axis 78. This arrangement of the load lifting apparatus 60 also avoids the situation where a load suspended from the load-bearing element 70 is set in rotation about the axis of the cable 64 when the rotor 80 is in operation, this being achieved, once again, by the V-shaped overall configuration of the cable 64.

Figure 5:
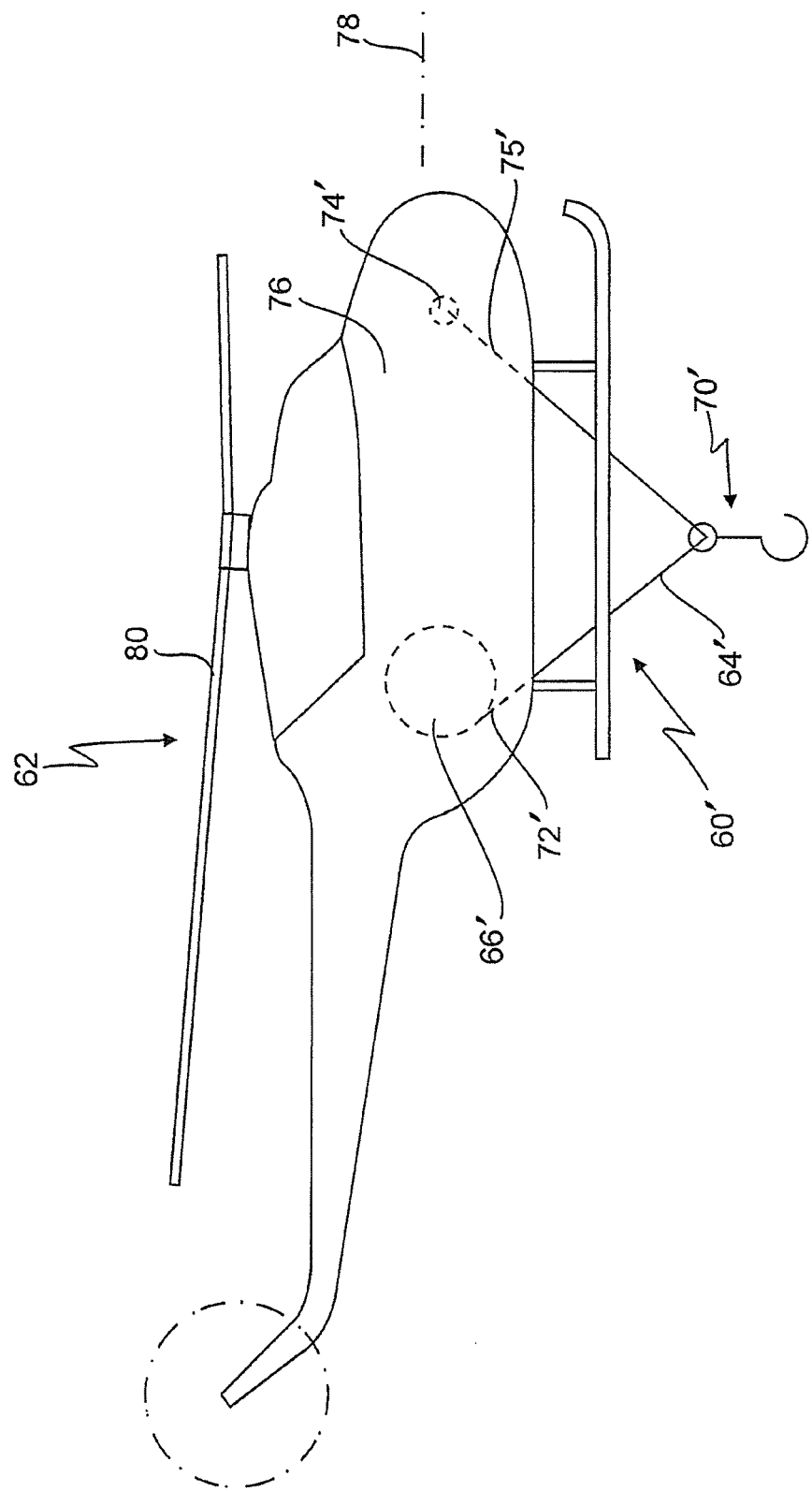
FIG. 5 shows a modification of the load lifting apparatus in FIG. 4.

FIG. 5 shows a modification of the load lifting apparatus 60 in FIG. 4, and it is designated 60'. In the case of the load lifting apparatus 60', the force-introduction location 72' and the cable-attachment location 74' are located approximately in the longitudinal center plane of the helicopter 62. In this case, the cable store 66 may be arranged, for example, in the cabin 76 of the helicopter 62. In this case, the cable-attachment location 74' may likewise be arranged in the cabin 76, wherein, in such a case, the cable 64' can be let out of the helicopter 62 in the downward direction through a hatch in the floor of the cabin 76 of the helicopter 62. In the case of the helicopter 62, as illustrated, having a skid undercarriage, the cable 64' runs between the skids on either side of the helicopter 62.

It can be gathered from the above, that, as far as the arrangement of the force-introduction location 72' and of the cable-attachment location 74' are concerned, it is possible to have modifications which a person skilled in the art can easily infer from the above description. With the proviso that the positions of the force-introduction location 72' and of the cable-attachment location 74' should be selected such that the cable-attachment location 74' is spaced apart as far as possible from the force-introduction location 72', in order to avoid rotation of the load suspended from the cable, it is possible, for selecting the positions, to take account of the additional aspect of reducing tilting moments arising from a suspended load, as has been described above.

What is claimed is:

1. A helicopter, comprising:
   a load lifting apparatus, the load lifting apparatus having
   a cable having a length and a free end,
   a cable store for storing at least a part of the length of the cable, wherein the cable can be removed from the cable store,
   a load-bearing element arranged on the cable for suspending a load from the load bearing element, the load-bearing element being moved downwards from the helicopter upon removal of the cable from the cable store, the load-bearing element being arranged on the cable such that it can move along the cable,
   a force-introduction location arranged on the helicopter, on which the cable acts on the helicopter, as the load-bearing element is being lowered or raised, and
   at least one cable-attachment location arranged on the helicopter for securing the free end of the cable on the helicopter, the at least one cable-attachment location being spaced apart from the force-introduction location so that the cable extends between the force-introduction location and the cable-attachment location.

2. The helicopter of claim 1, wherein the at least one cable-attachment location is spaced apart from the force-introduction location in a direction transverse to a longitudinal axis of the helicopter.

3. The helicopter of claim 2, wherein the force-introduction location is arranged on one side of a longitudinal center axis of the helicopter, at a distance from the longitudinal center axis, and the at least one cable-attachment location is arranged on the other side of the longitudinal center axis, at a distance therefrom.

4. The helicopter of claim 1, wherein the at least one cable-attachment location is spaced apart from the force-introduction location in a direction of a longitudinal axis of the helicopter.

5. The helicopter of claim 4, wherein the at least one cable-attachment location and the force-introduction location are arranged laterally on a same side of the helicopter.

6. The helicopter of claim 4, wherein the at least one cable-attachment location and the force-introduction location are arranged on a longitudinal center axis of the helicopter.

7. The helicopter of claim 1, wherein the helicopter has a skid undercarriage, the at least one cable-attachment location being arranged on the skid undercarriage.

8. The helicopter of claim 1, wherein the load-bearing element has at least one deflecting roller, via which the load-bearing element is guided such that it can move along the cable.

9. The helicopter of claim 1, wherein the load-bearing element has a sliding-action deflecting element, on which the cable is guided with a sliding action.

10. The helicopter of claim 8, wherein the load-bearing element has a cup, in which the deflecting roller is arranged.

11. The helicopter of claim 8, wherein the load-bearing element has a cup, in which the sliding-action deflecting element is arranged.

12. The helicopter of claim 1, wherein the free end of the cable has a rapid-release closure for securing the free end of the cable to the cable-attachment location.

13. The helicooter of claim 1, wherein the cable store has a motor winch.

14. A helicopter, comprising:
    a load lifting apparatus, the load lifting apparatus having—
    a cable having a length and a free end,
    a cable store for storing at least a part of the length of the cable, wherein the cable can be removed from the cable store, and
    a load-bearing element arranged on the cable for suspending a load from the load bearing element, the load-bearing element being moved downwards from the helicopter upon removal of the cable from the cable store, the load-bearing element being arranged on the cable such that it can move along the cable,
    a force-introduction location, on which the cable acts on the helicopter, as the load-bearing element is being lowered or raised, and
    at least one cable-attachment location for securing the free end of the cable on the helicopter, the at least one cable-attachment location being spaced apart from the force-introduction location so that the cable extends between the force-introduction location and the cable-attachment location in a V-shape.

15. The helicopter of claim 14, wherein the at least one cable-attachment location is spaced apart from the force-introduction location in a direction transverse to a longitudinal center axis of the helicopter.

16. The helicopter of claim 14, wherein the force-introduction location is arranged on one side of a longitudinal center axis of the helicopter, at a distance from the longitudinal center axis, and the at least one cable-attachment location is arranged on the other side of the longitudinal center axis, at a distance therefrom.

17. The helicopter of claim 14, wherein the at least one cable-attachment location is spaced apart from the force-introduction location in a direction of a longitudinal axis of the helicopter.

18. The helicopter of claim 14, wherein the at least one cable-attachment location and the force-introduction location are arranged laterally on a same side of the helicopter.

19. The helicopter of claim 14, wherein the at least one cable-attachment location and the force-introduction location are arranged on a longitudinal center axis of the helicopter.

20. The helicopter of claim 14, wherein the helicopter has a skid undercarriage, the at least one cable-attachment location being arranged on the skid undercarriage.

21. A helicopter, comprising:
a load lifting apparatus, the load lifting apparatus having—
a cable having a length and a free end,
- a cable store for storing at least a part of the length of the cable, wherein the cable can be removed from the cable store, and
- a load-bearing element arranged on the cable for suspending a load from the load bearing element, the load-bearing element being moved downwards from the helicopter upon removal of the cable from the cable store, the load-bearing element being arranged on the cable such that it can move along the cable, a force-introduction location, on which the cable acts on the helicopter, as the load-bearing element is being lowered or raised, and a plurality of cable-attachment locations for selectively securing the free end of the cable on the helicopter, the at least one cable-attachment location being spaced apart from the force-introduction location so that the cable extends between the force-introduction location and the cable-attachment location, wherein a first cable-attachment location of the plurality of cable-attachment locations is spaced apart from the force-introduction location in a direction transverse to a longitudinal center axis of the helicopter, and further wherein a second cable-attachment location of the plurality of cable-attachment locations is spaced apart from the force-introduction location in a direction of the longitudinal center axis of the helicopter.

\* \* \* \* \*